(12) United States Patent
Ishikura et al.

(10) Patent No.: US 11,729,329 B2
(45) Date of Patent: Aug. 15, 2023

(54) IMAGE READING APPARATUS COMPRISING A DISPLAY ON A REAR SIDE OF THE IMAGE READING APPARATUS THAT IS NOT WITHIN A MOVEMENT TRAJECTORY OF A COVER

(71) Applicant: FUJIFILM Business Innovation Corp., Tokyo (JP)

(72) Inventors: Kenichi Ishikura, Kanagawa (JP); Ryusuke Nakata, Kanagawa (JP); Kei Otagiri, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/546,027

(22) Filed: Dec. 8, 2021

(65) Prior Publication Data
US 2023/0059440 A1    Feb. 23, 2023

(30) Foreign Application Priority Data
Aug. 23, 2021    (JP) .................................. 2021-135515

(51) Int. Cl.
*H04N 1/00*    (2006.01)
*H04N 1/04*    (2006.01)

(52) U.S. Cl.
CPC ..... *H04N 1/00816* (2013.01); *H04N 1/00496* (2013.01); *H04N 1/00551* (2013.01); *H04N 1/00809* (2013.01)

(58) Field of Classification Search
CPC .......... H04N 1/00816; H04N 1/00493; H04N 1/00496; H04N 1/00551; H04N 1/00809; G06F 1/1601; G03G 15/5016
USPC ................................. 358/497, 1.13; 345/173
See application file for complete search history.

(56) References Cited

U.S. PATENT DOCUMENTS

| 5,488,453 | A | * | 1/1996 | Labudde | ............ | G03G 15/5016 |
| | | | | | | 248/920 |
| 2004/0233468 | A1 | * | 11/2004 | Ibaraki | ................... | G06K 15/00 |
| | | | | | | 345/173 |
| 2012/0236340 | A1 | * | 9/2012 | Tsuduki | ............. | H04N 1/00493 |
| | | | | | | 358/1.12 |
| 2021/0120137 | A1 | | 4/2021 | Okamoto et al. | | |

FOREIGN PATENT DOCUMENTS

JP    2021068980    4/2021

* cited by examiner

*Primary Examiner* — Chad Dickerson
(74) *Attorney, Agent, or Firm* — JCIPRNET

(57) ABSTRACT

An image reading apparatus includes a reader configured to read an image, and a movable member that is movable when the reader is not reading the image, and configured to move within a region where a fixed member fixed above the reader is not present on a movement trajectory of the movable member.

16 Claims, 6 Drawing Sheets

IMAGE READING APPARATUS COMPRISING A DISPLAY ON A REAR SIDE OF THE IMAGE READING APPARATUS THAT IS NOT WITHIN A MOVEMENT TRAJECTORY OF A COVER

CROSS-REFERENCE TO RELATED APPLICATIONS

This application is based on and claims priority under 35 USC 119 from Japanese Patent Application No. 2021-135515 filed Aug. 23, 2021.

BACKGROUND

(i) Technical Field

The present disclosure relates to an image reading apparatus.

(ii) Related Art

There is known a document reading apparatus including a document placement stand having a document reader, and an automatic document feeder supported on the document placement stand and turnable between a closed position where the automatic document feeder covers the upper surface of the document placement stand and an open position where the upper surface of the document placement stand is exposed (see, for example, Japanese Unexamined Patent Application Publication No. 2021-068980).

SUMMARY

Aspects of non-limiting embodiments of the present disclosure relate to an image reading apparatus including a reader that reads an image, and a fixed member provided above the reader. In the image reading apparatus, a movable member does not interfere with the fixed member when the movable member is moved while the reader is not reading an image.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image reading apparatus comprising a reader configured to read an image, and a movable member that is movable when the reader is not reading the image, and configured to move within a region where a fixed member fixed above the reader is not present on a movement trajectory of the movable member.

BRIEF DESCRIPTION OF THE DRAWINGS

Exemplary embodiments of the present disclosure will be described in detail based on the following figures, wherein.

DETAILED DESCRIPTION

Exemplary embodiments of the present disclosure are described below in detail with reference to the drawings. For convenience of the description, an arrow UP in FIG. 1 indicates an upward direction of an image reading apparatus 20, and an arrow RH in FIG. 1 indicates a rightward direction of the image reading apparatus 20. In the following description, upward, downward, rightward, and leftward directions correspond to the upward, downward, rightward, and leftward directions of the image reading apparatus 20 unless otherwise noted. A lateral direction corresponds to a width direction of the image reading apparatus 20.

Figure 1:
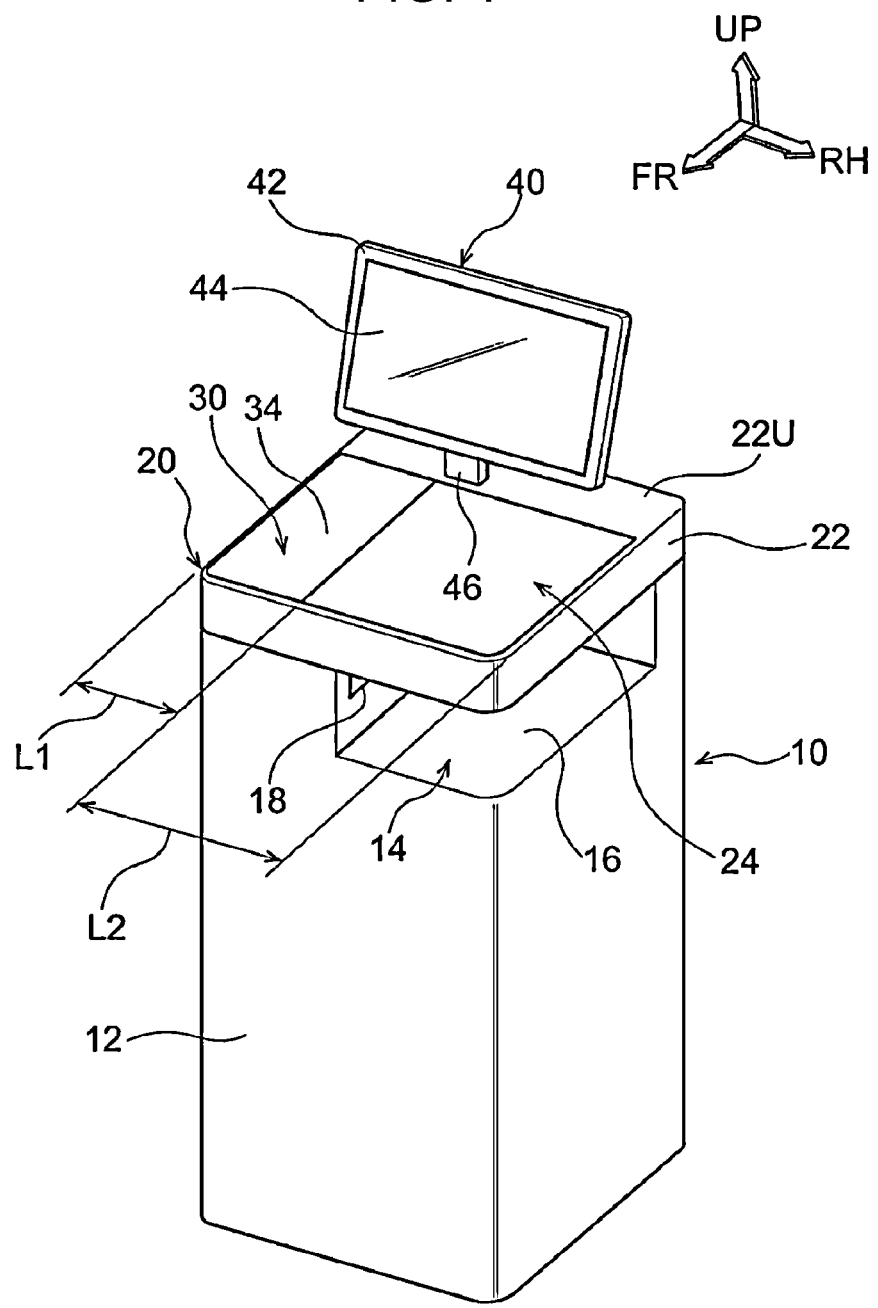
FIG. 1 is a perspective view illustrating an image forming apparatus including an image reading apparatus according to exemplary embodiments.

For convenience of the description, an arrow FR in FIG. 1 indicates a forward direction of the image reading apparatus 20, and a direction opposite to the forward direction is a rearward direction of the image reading apparatus 20. A user (operator) stands in front of the image reading apparatus 20. In other words, the user's standing position is on the front side of the image reading apparatus 20.

As illustrated in FIG. 1, an image forming apparatus 10 including the image reading apparatus 20 according to the exemplary embodiments has a rectangular apparatus body 12 serving as a housing. The apparatus body 12 includes a containing part (not illustrated) that contains recording paper (not illustrated) that is an example of a recording medium, a transport part (not illustrated) that transports the recording paper, an image forming part (not illustrated) that forms an image on the transported recording paper, and a fixing part (not illustrated) that fixes the image formed on the recording paper.

A cutout stepped part 14 is formed at the right of the upper end of the apparatus body 12. The bottom of the stepped part 14 serves as a paper output part 16. A paper outlet 18 is formed at a side wall oriented rightward in the stepped part 14. The recording paper with the fixed image is output through the paper outlet 18 and placed on the paper output part 16.

The image reading apparatus 20 is provided above the apparatus body 12. The image reading apparatus 20 has a rectangular apparatus body 22 serving as a housing. The fore-and-aft length and the lateral length of the apparatus body 22 are substantially equal to those of the apparatus body 12. A top surface 22U of the apparatus body 22 partially serves as a placement part 24 on which a document (not illustrated) is placed. The document is an example of a reading target to be subjected to image reading using a document camera (not illustrated). The document camera is arranged above a display 40 described later.

Figure 2:
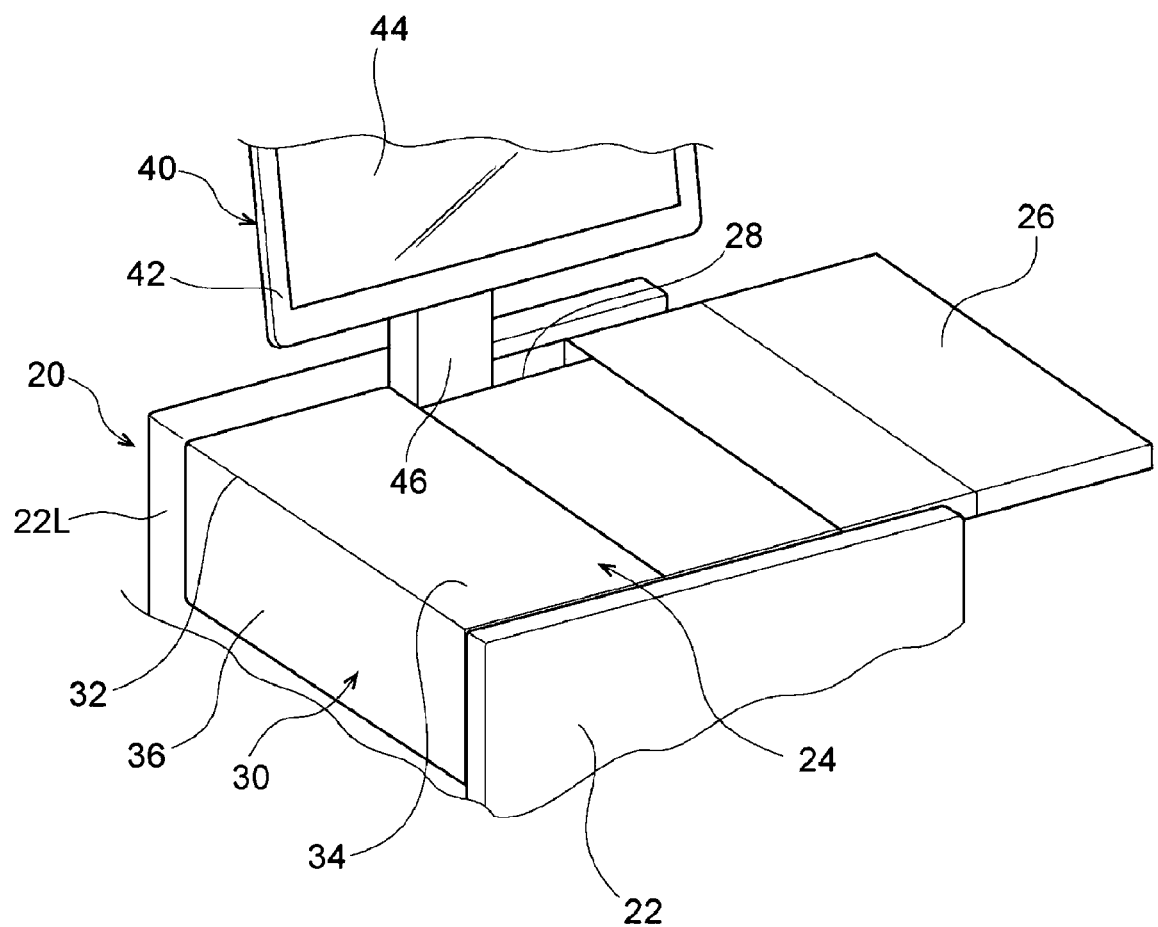
FIG. 2 is a perspective view illustrating the image reading apparatus according to the exemplary embodiments.

As illustrated in FIG. 2, the placement part 24 in plan view has a rectangular shape whose longitudinal direction corresponds to the lateral direction. A right part of the placement part 24 is drawable in the rightward direction (outward in the longitudinal direction). The drawn part of the placement part 24 constitutes a document setting part 26 on which the document is placed when reading the document while transporting the document. The apparatus body 22 of the image reading apparatus 20 includes a transport part (not illustrated) that transports the document, and a reader 25 (see FIG. 4) that reads an image on the document.

Figure 3:
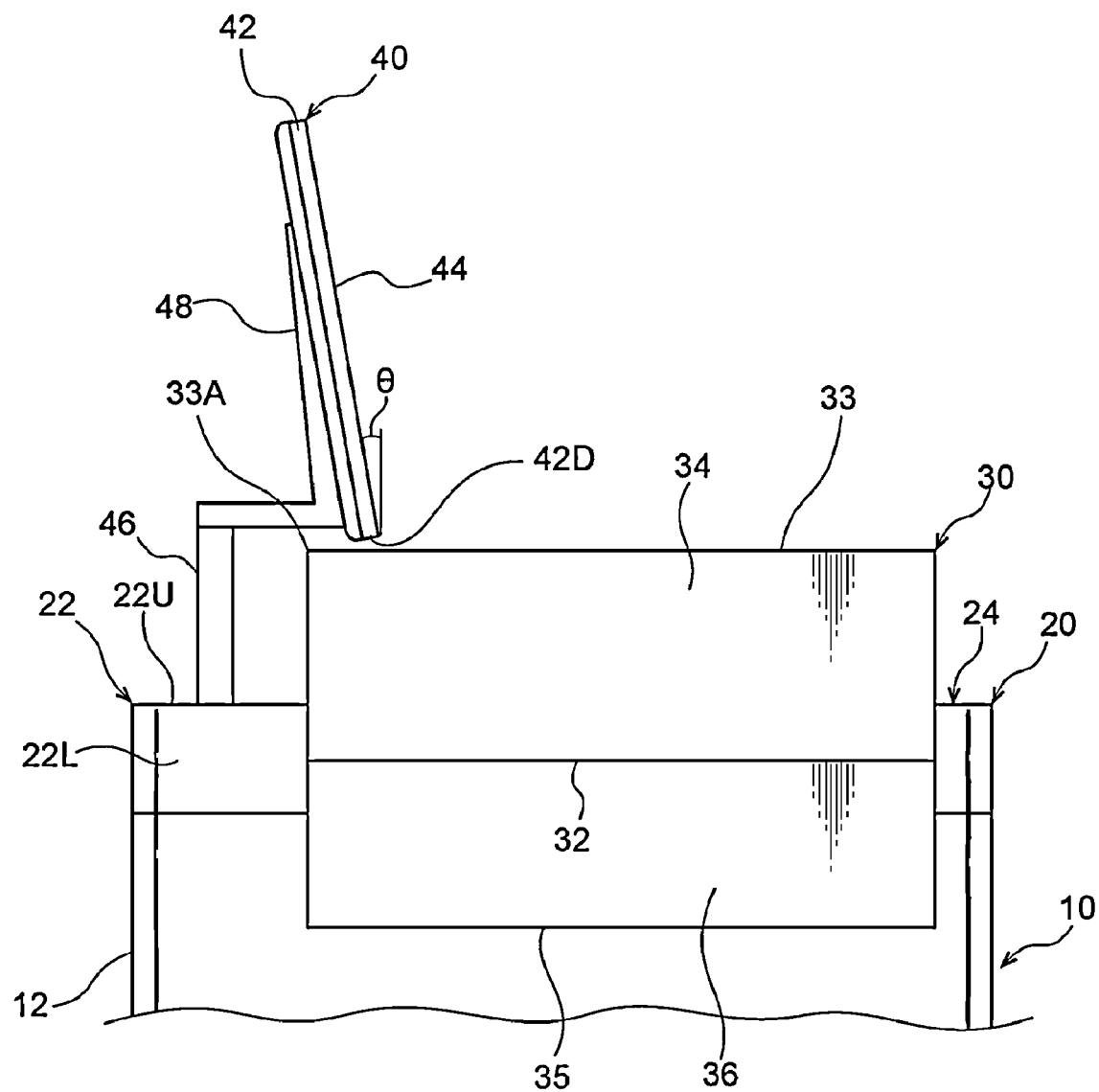
FIG. 3 is a side view illustrating an image reading apparatus according to a first exemplary embodiment.
Figure 4:
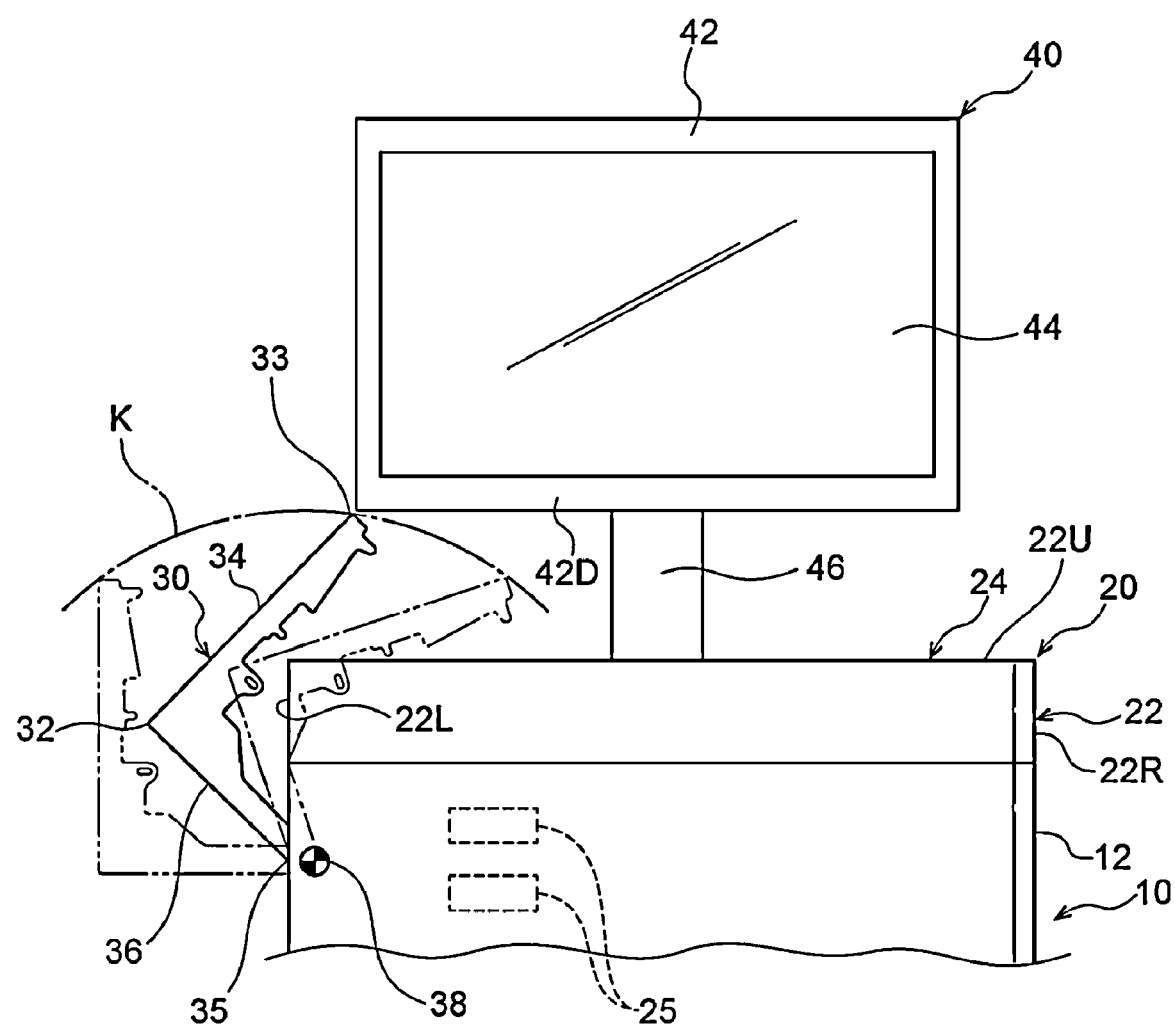
FIG. 4 is a front view illustrating the image reading apparatus according to the first exemplary embodiment.

As illustrated in FIG. 3 and FIG. 4, a left part of the placement part 24 is a cover 30 that is an example of a movable member to be moved (opened) when no document is placed on the placement part 24 as in a case of removing a document jammed while being transported by the transport part. In front view from the user's standing position, the cover 30 has a substantial "L" shape. A lower end 35 (one end) of the cover 30 is rotatably supported on a rotational shaft 38 whose axial direction corresponds to the fore-and-aft direction (front view direction). The rotational shaft 38 is supported on the apparatus body 22.

A lower part of the cover 30 (near the rotational shaft 38) extending from a bent part 32 bent substantially at 90° constitutes a left wall 22L of the apparatus body 22. An upper part of the cover 30 (opposite to the rotational shaft 38) extending from the bent part 32 constitutes the placement part 24. An upper surface 34 of the cover 30 is a flat surface. A side surface 36 of the cover 30 is also a flat surface.

In plan view of the cover 30, a length L1 of the upper surface 34 along the lateral direction (direction orthogonal to the axial direction of the rotational shaft 38) is smaller than a length L2 of the remaining part of the placement part 24 except the upper surface 34 of the cover 30 (part drawn in the rightward direction to constitute the document setting part 26) (see FIG. 1). In other words, the cover 30 is positioned on a left side across the center of the apparatus body 22 in the lateral direction (on one side of the placement part 24 in the longitudinal direction).

Thus, the length of a trajectory K (indicated by a chain line in FIG. 4; may hereinafter be referred to as "movement trajectory K") of a distal end 33 of the cover 30 during movement (rotation about the rotational shaft 38) is minimized. The cover 30 is movable within a region where the display 40 is not present.

First Exemplary Embodiment

A first exemplary embodiment is described about the image reading apparatus 20 having the structure described above. As illustrated in FIG. 1 to FIG. 4, the display 40 that is an example of a fixed member and has a rectangular shape whose longitudinal direction corresponds to the lateral direction in front view (from the user's standing position) is provided above the placement part 24 (reader 25) on a rear side of the apparatus body 22.

Specifically, a rectangular column 46 is provided upright at the center in the lateral direction on a rear side of the upper surface of the apparatus body 12. The center of the back surface of the display 40 in the lateral direction is fixed to a support member 48 having a substantial "L" shape in side view and integrated with the upper end of the column 46. That is, the display 40 is supported on the column 46 via the support member 48 and is fixed while being inclined rearward at a predetermined angle θ with respect to a vertical direction so that the user may easily touch an operation part 44 described later.

As illustrated in FIG. 2, a hollow 28 that is an example of a reception part that receives the column 46 is formed at the rear end of the top surface 22U of the apparatus body 22. In plan view, the hollow 28 has a substantially rectangular shape whose longitudinal direction corresponds to the lateral direction. The hollow 28 is sized so that the column 46 on the apparatus body 12 of the image forming apparatus 10 passes through the hollow 28.

As illustrated in FIG. 1 to FIG. 4, the display 40 has a rectangular frame 42. A screen enclosed by the frame 42 is the operation part 44 to be operated by the user. That is, the display 40 has the operation part 44 that is a so-called touchscreen. The user may input information by touching items displayed on the screen of the operation part 44 with his/her finger.

For example, the display 40 (operation part 44) has a size of 15 inches and is heavy. Therefore, the display 40 is supported on the apparatus body 12 of the image forming apparatus 10 via the column 46. That is, the display 40 is not provided on the apparatus body 22 of the image reading apparatus 20. The lateral length of the apparatus body 22 of the image reading apparatus 20 is slightly larger than the lateral length of the display 40. That is, the display 40 of the first exemplary embodiment does not project laterally outward beyond a right wall 22R and the left wall 22L of the apparatus body 22 in plan view.

As illustrated in FIG. 3 and FIG. 4, the display 40 is arranged above a movement region of the rotating (moving) cover 30 (movement trajectory K). Specifically, the column 46 and the support member 48 are positioned so that the display 40 is arranged above a rear end 33A along the distal end 33 that passes the highest point in the cover 30 rotating (moving) about the rotational shaft 38.

In other words, a lower end 42D of the frame 42 of the display 40 supported on the column 46 and the support member 48 (including a lower part at the front end of the support member 48 in FIG. 3) overlaps, from the rear side, the rear end of the cover 30 rotating (moving) about the rotational shaft 38 (including the rear end 33A along the distal end 33) in side view and plan view.

The display 40 is present above the movement trajectory K of the rotating (moving) cover 30 in front view and also above the movement region of the rotating (moving) cover 30 (region of a substantial quarter of a column) in side view. Even if the angle of the display 40 is changeable and is set to, for example, an angle at which the display 40 stands along the vertical direction (θ=0°), the display 40 of the first exemplary embodiment is present above the movement region (movement trajectory K) of the rotating (moving) cover 30.

The positional relationship in plan view is such that a part of the display 40 (left part corresponding substantially to ⅓ of the lateral length) is present within the movement region (on the movement trajectory K) of the rotating (moving) cover 30.

The image reading apparatus 20 having the structure described above according to the first exemplary embodiment is summarized as follows.

The cover 30 is movable (openable) within the region where the display 40 is not present when no document is placed on the placement part 24 as in a case of removing a document jammed in the apparatus body 22 while the transport part is transporting the document set on the document setting part 26.

In other words, the display 40 is arranged above the movement trajectory K of the distal end 33 of the cover 30 in front view and also above the rear end of the cover 30 (including the rear end 33A along the distal end 33) in side view.

A part of the display 40 (left part) is present within the movement region (on the movement trajectory K) of the cover 30 in plan view.

The cover 30 constitutes the placement part 24. In plan view, the length L1 of the cover 30 along the lateral direction (direction orthogonal to the axial direction of the rotational shaft 38) is smaller than the length L2 of the remaining part of the placement part 24 except the upper surface 34 of the cover 30. Therefore, the length of the movement trajectory K of the distal end 33 of the cover 30 during rotation (movement) is minimized (the radius of rotation is reduced) in front view.

The display 40 is positioned on the rear side opposite to the user's standing position (front side). The display 40 does not project laterally outward beyond the right wall 22R and the left wall 22L of the apparatus body 22 in plan view.

The hollow 28 through which the column 46 passes is formed at the rear end of the top surface 22U of the apparatus body 22.

Second Exemplary Embodiment

A second exemplary embodiment is described. Portions equivalent to those in the first exemplary embodiment are represented by the same reference symbols to omit detailed description (including common operations) as appropriate.

Figure 5:
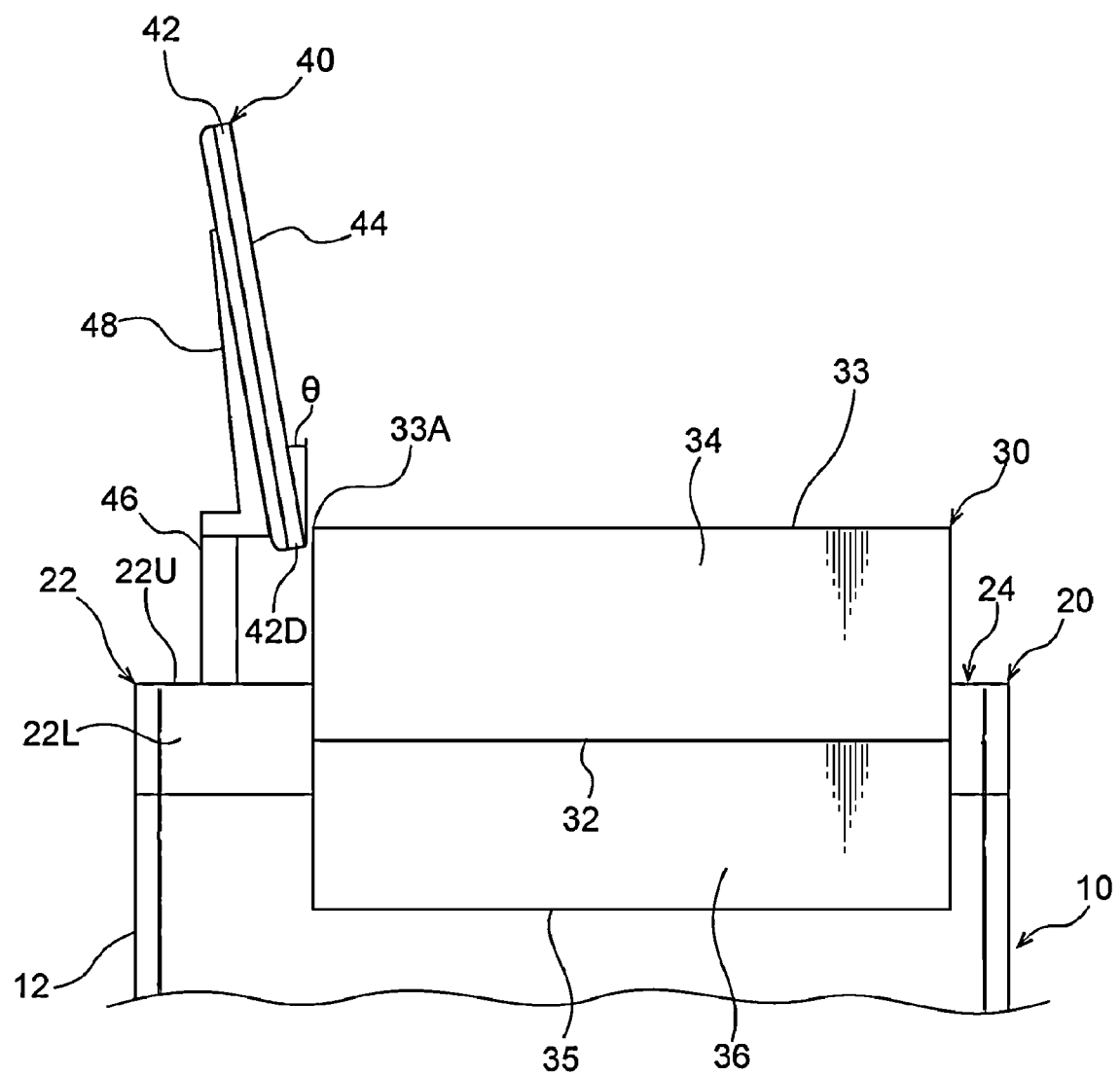
FIG. 5 is a side view illustrating an image reading apparatus according to a second exemplary embodiment.

As illustrated in FIG. 5, the second exemplary embodiment differs from the first exemplary embodiment in that the display 40 is arranged behind the movement region (movement trajectory K) of the rotating (moving) cover 30. Specifically, the column 46 and the support member 48 are set so that the lower end 42D of the frame 42 of the display 40 is arranged behind the rear end of the cover 30 (including the rear end 33A along the distal end 33).

In front view from the user's standing position, a part of the display 40 (at least a lower left corner) is present on the movement trajectory K of the distal end 33 of the cover 30 during rotation (movement). That is, the display 40 is positioned at a height smaller than the height in the first exemplary embodiment.

Third Exemplary Embodiment

A third exemplary embodiment is described. Portions equivalent to those in the first exemplary embodiment and the second exemplary embodiment are represented by the same reference symbols to omit detailed description (including common operations) as appropriate.

Figure 6:
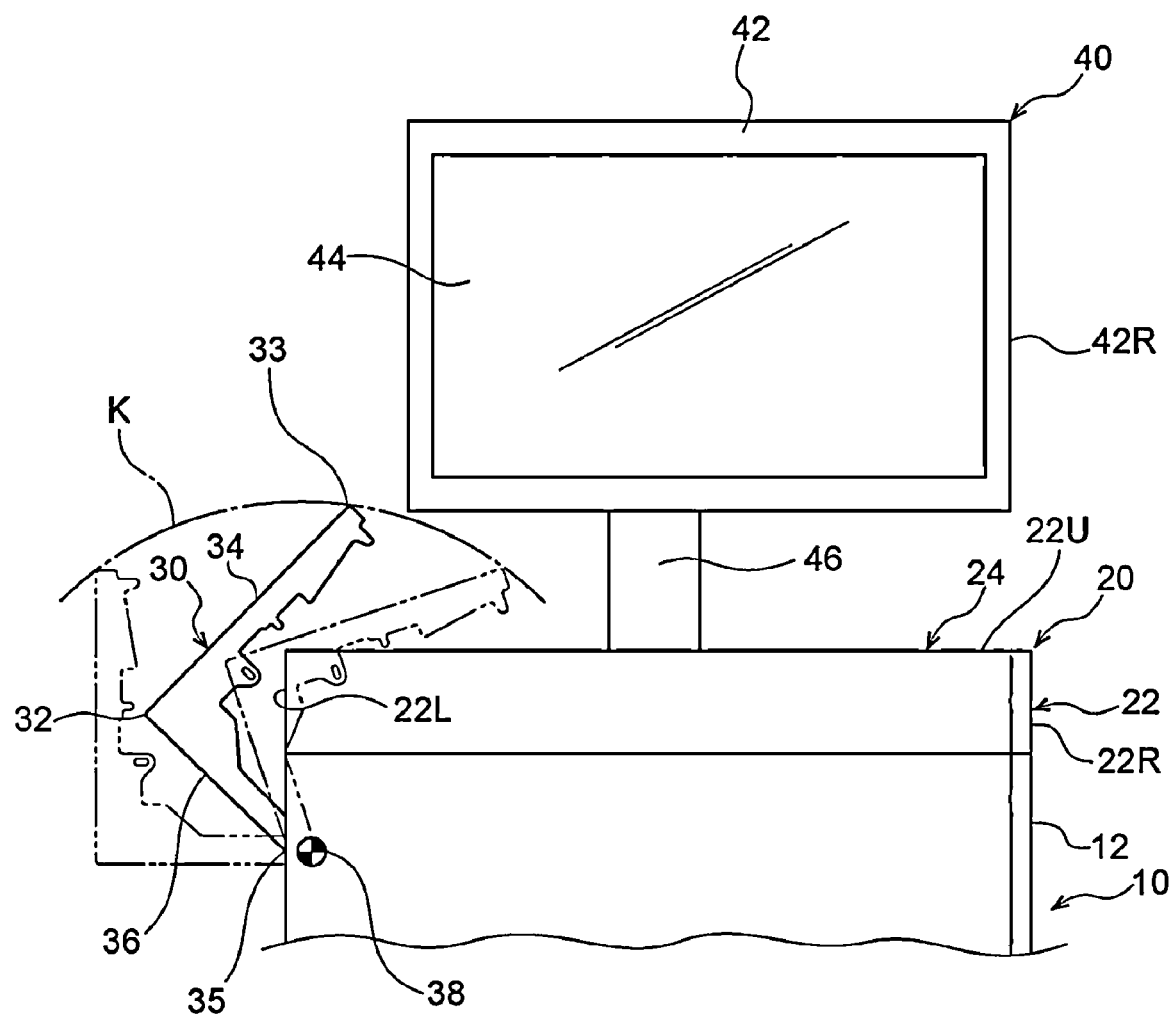
FIG. 6 is a front view illustrating an image reading apparatus according to a third exemplary embodiment.

As illustrated in FIG. 6, the third exemplary embodiment differs from the first exemplary embodiment and the second exemplary embodiment in that the display 40 is shifted to a right side across the center of the apparatus body 22 in the lateral direction (to the other side of the placement part 24 in the longitudinal direction). Specifically, the display 40 is positioned at the same height as the height in the second exemplary embodiment and is shifted to the right side away from the movement region (movement trajectory K) of the rotating (moving) cover 30 in front view.

That is, the display 40 of the third exemplary embodiment is not present on the movement trajectory K of the distal end 33 of the cover 30 during rotation (movement) in plan view and front view.

For example, the display 40 may be supported on the apparatus body 22 of the image reading apparatus 20. For example, the display 40 may be supported on a support member (not illustrated) directly arranged in an arrangement space instead of the apparatus body 12 of the image forming apparatus 10 and the apparatus body 22 of the image reading apparatus 20. The image reading apparatus 20 of the exemplary embodiments need not have the document camera that reads an image on a document placed on the placement part 24. That is, the image reading apparatus 20 of the exemplary embodiments may read the image on the document by the reader 25 alone.

For example, in the first exemplary embodiment, the display 40 may automatically ascend or descend in conjunction with the rotation (movement) of the cover 30. That is, the display 40 may ascend in conjunction with opening of the cover 30 and descend in conjunction with closing of the cover 30. The cover 30 need not be opened or closed by rotating about the rotational shaft 38. For example, the cover 30 may be opened by moving upward and then leftward.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image reading apparatus comprising:
    a display panel fixed above an apparatus body in a vertical direction, using a column and support member, and positioned above a rear portion of a cover distal end; and
    a cover that is movable in a semicircular direction rotating around a fore and aft directed axis of a rotational shaft when the image reading apparatus is not reading the image, and configured to move within a region where the display panel fixed above the apparatus body is not present on a movement trajectory of the cover, wherein
    a maximum height of the movement trajectory of the cover in the vertical direction does not exceed a maximum height of a lowest point of a bottom of the display panel in the vertical direction, and
    the cover comprises a side surface covering a side of the apparatus body and an upper surface connected to the side surface through a bent portion to cover a top of the apparatus body in order that the maximum height of the distal end of the cover in the vertical direction does not exceed the maximum height of a lowest point of a bottom of the display panel in the vertical direction.

2. The image reading apparatus according to claim 1, wherein the display panel comprises an operation part, and is present on a rear side opposite to a standing position of an operator.

3. The image reading apparatus according to claim 2, wherein the display panel is present on the movement trajectory of the cover in plan view.

4. The image reading apparatus according to claim 2, wherein the display panel is present on the movement trajectory of the cover in front view from the standing position of the operator.

5. The image reading apparatus according to claim 2, wherein, in plan view, the display panel is shifted in a direction orthogonal to a direction along front view from the standing position of the operator so that the display panel is not present on the movement trajectory of the cover in the plan view and in the front view.

6. The image reading apparatus according to claim 1, wherein the cover is rotatable about an axis extending in a direction along front view from a standing position of an operator.

7. The image reading apparatus according to claim 2, wherein the cover is rotatable about an axis extending in a direction along front view from the standing position of the operator.

8. The image reading apparatus according to claim 3, wherein the cover is rotatable about an axis extending in a direction along front view from the standing position of the operator.

9. The image reading apparatus according to claim 4, wherein the cover is rotatable about an axis extending in a direction along the front view from the standing position of the operator.

10. The image reading apparatus according to claim 5, wherein the cover is rotatable about an axis extending in a direction along the front view from the standing position of the operator.

11. The image reading apparatus according to claim 6, wherein, in plan view, a length of the cover along a direction orthogonal to the direction of the axis is smaller than a length of a remaining part except the cover along the orthogonal direction.

12. The image reading apparatus according to claim 7, wherein, in plan view, a length of the cover along a direction orthogonal to the direction of the axis is smaller than a length of a remaining part except the cover along the orthogonal direction.

13. The image reading apparatus according to claim 8, wherein, in the plan view, a length of the cover along a direction orthogonal to the direction of the axis is smaller than a length of a remaining part except the movable member along the orthogonal direction.

14. The image reading apparatus according to claim 9, wherein, in plan view, a length of the cover along a direction orthogonal to the direction of the axis is smaller than a length of a remaining part except the cover along the orthogonal direction.

15. The image reading apparatus according to claim 10, wherein, in the plan view, a length of the cover along a direction orthogonal to the direction of the axis is smaller than a length of a remaining part except the cover along the orthogonal direction.

16. An image reading apparatus comprising:
displaying means fixed above an apparatus body in a vertical direction, using a column and support member, and positioned above a rear portion of a cover distal end, and
covering means that is movable in a semicircular direction rotating around a fore and aft directed axis of a rotational shaft when the image reading apparatus is not reading the image, and configured to move within a region where the displaying means fixed above the apparatus body is not present on a movement trajectory of the covering means, wherein
a maximum height of the movement trajectory of the covering means in the vertical direction does not exceed a maximum height of a lowest point of a bottom of the displaying means in the vertical direction, and
the covering means comprises a side surface covering a side of the apparatus body and an upper surface connected to the side surface through a bent portion to cover a top of the apparatus body in order that the maximum height of the distal end of the cover in the vertical direction does not exceed the maximum height of a lowest point of a bottom of the displaying means in the vertical direction.

* * * * *